United States Patent
Perner

(10) Patent No.: US 6,552,745 B1
(45) Date of Patent: Apr. 22, 2003

(54) CMOS ACTIVE PIXEL WITH MEMORY FOR IMAGING SENSORS

(75) Inventor: Frederick A. Perner, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/057,429

(22) Filed: Apr. 8, 1998

(51) Int. Cl.[7] .......................... H04N 3/14; H04N 5/335
(52) U.S. Cl. ....................................... 348/308; 348/243
(58) Field of Search .......................... 348/308, 302, 348/297, 294, 241, 243, 207.99; 250/208.1; 257/292, 291, 532; 341/155, 172, 144

(56) References Cited

U.S. PATENT DOCUMENTS

| | | | |
|---|---|---|---|
| 5,461,425 A | | 10/1995 | Fowler et al. ............. 348/294 |
| 5,471,515 A | * | 11/1995 | Fossum et al. ............. 257/292 |
| 5,565,915 A | * | 10/1996 | Kindo et al. ............... 348/308 |
| 5,665,959 A | | 9/1997 | Fossum et al. ........... 250/208.1 |
| 5,880,691 A | * | 3/1999 | Fossum et al. ............. 341/162 |
| 5,886,659 A | * | 3/1999 | Pain et al. .................. 341/155 |
| 5,892,540 A | * | 4/1999 | Kozlowski et al. ......... 348/308 |
| 5,949,483 A | * | 9/1999 | Fossum et al. ............. 348/303 |
| 5,962,844 A | * | 10/1999 | Merrill et al. .............. 348/308 |
| 5,982,318 A | * | 11/1999 | Yiannoulos ................ 348/294 |
| 6,021,172 A | * | 2/2000 | Fossum et al. ............. 257/292 |
| 6,069,377 A | * | 5/2000 | Prentice et al. ............ 257/292 |
| 6,115,065 A | * | 9/2000 | Yadid-Pecht et al. ....... 348/308 |
| 6,137,535 A | * | 10/2000 | Meyers .................... 250/208.1 |
| 6,330,030 B1 | * | 12/2001 | O'Connor ................... 348/308 |
| 6,344,877 B1 | * | 2/2002 | Gowda et al. .............. 348/308 |
| 6,377,303 B2 | * | 4/2002 | O'Connor ................... 348/308 |

FOREIGN PATENT DOCUMENTS

| WO | WO 95/22180 | 8/1995 | ............ H01N/3/14 |
|---|---|---|---|

* cited by examiner

Primary Examiner—Aung S. Moe

(57) ABSTRACT

An imaging apparatus and a method of capturing and storing an image in digital form within a photosensitive area of the apparatus include integrating an array of memory cells within each pixel of the photosensitive area. Preferably, the memory cells are dual port memory cells, such that write operations can be performed in a parallel manner while reading operations are performed in a serial manner. In the preferred embodiment, each array contains a sufficient number of memory cells to store two digital words representing a photo signal and a reference signal. A comparator within each pixel operating in unison with a counter and a ramp generator captures the photo signal and the reference signal in digital form. The design of the imaging apparatus allows each pixel in the photosensitive area to capture and store the signals in a parallel manner. The parallel function of the apparatus increases the electronic shutter speed, while the integrated memory array eliminates the need for an external frame buffer memory.

19 Claims, 5 Drawing Sheets

CMOS ACTIVE PIXEL WITH MEMORY FOR IMAGING SENSORS

TECHNICAL FIELD

The invention relates generally to imaging sensors and more particularly to an imaging sensor utilizing CMOS active pixels.

DESCRIPTION OF THE RELATED ART

Solid-state imaging sensors are utilized in telescopes, digital cameras, facsimile machines, scanners, and other imaging devices. An imaging sensor captures an image by converting incident light reflected from the image into electrical signals in an analog form. A typical imaging sensor has an array of "pixels" or discreet regions, each pixel containing a light sensitive element. Each light sensitive element generates an electrical signal which is proportional to the intensity of the incident light on that pixel. The electrical signals from all the pixels are converted into digital form and stored in memory. The digitized image data can then be displayed on a monitor, printed onto a sheet of paper, or analyzed for information concerning the properties of the image.

Conventional imaging devices use what are commonly known as "charge coupled devices" (CCDs) in imaging sensors. A CCD utilizes the properties of a metal-oxide semiconductor (MOS) to create a capacitor at each of its pixels. The capacitor on a CCD is able to accumulate electrical charge generated by the incident light. The accumulated electrical charge is then transferred as an electrical signal to off-chip circuitry, such as an analog-to-digital converter (ADC) and memory.

Although CCDs have many strengths, including high sensitivity, CCDs also have a number of weaknesses. One significant weakness is that CCDs require a substantial amount of power for external control signals and large clock swings. Another significant weakness is that on-chip integration of electronic devices is very difficult to fabricate on CCDs. In addition, CCDs require specialized fabrication processing that is more expensive than conventional MOS fabrication.

Due to the weaknesses of CCDs, another type of imaging sensors has developed. These imaging sensors are known as active pixel sensors (APSs). Unlike CCDs, APSs use mainstream complementary metal-oxide semiconductor (CMOS) technology for fabrication. In addition, APSs more readily accommodate on-chip circuitry along with the light sensitive elements, such as on-pixel amplifiers, timing and control circuits, multiplexers, and ADCs. APSs also require significantly less power to operate.

U.S. Pat. No. 5,461,425 to Fowler et al. (hereinafter Fowler), entitled "CMOS Imaging Sensor with Pixel Level A/D Conversion," describes an imaging sensor with on-pixel ADC circuitry on a single semiconductor chip. The imaging sensor of Fowler has an array of pixels, with each pixel including a phototransistor and an ADC. The analog signal generated by the photo-transistor is converted to a serial stream of bits of digital data by the on-pixel ADC. The digital data is then filtered and stored in an external memory. The on-pixel ADC is described as having the advantage of minimizing parasitic effects and distortion caused by low signal-to-noise ratio.

Another imaging sensor of interest is described in U.S. Pat. No. 5,665,959 to Fossum et al. (hereinafter Fossum), entitled "Solid-State Image Sensor with Focal-Plane Digital Photon-Counting Pixel Array." The imaging sensor of Fossum includes a top semiconductor chip which is "bump bonded" to a bottom semiconductor chip. The top semiconductor chip includes photo-detector diodes with corresponding unit cells, with each unit cell containing a buffer amplifier circuitry. The bottom semiconductor chip includes digital counters and may also include an accumulator (buffer memory).

What is needed is an imaging sensor having on-chip circuitry that accommodates compactness and signal manipulation.

SUMMARY OF THE INVENTION

An imaging apparatus and a method of capturing and storing an image in digital form within a photosensitive area include integrating an array of memory cells within each pixel of the photosensitive area. In the preferred embodiment, the arrays are formed on a monolithic structure and each array contains a sufficient number of memory cells to store an 8-bit or more digital word that is representative of the intensity of incident light that is reflected from the image. In the more preferred embodiment, the array has the capacity to store an additional 8-bit or more digital word. The additional word could represent a reference signal that can be used for fixed pattern noise cancellation.

Preferably, all of the memory cells within each pixel are dual port memory cells fabricated on a semiconductor chip. The dual port memory cells allow for independent write and read operations. For example, in a single pixel, the writing operations for all the memory cells can be performed simultaneously (i.e., in a parallel manner), while the read operations can be performed in a serial manner.

Each dual ported memory cell may be a dynamic random access memory (DRAM) cell formed by a write port, a storage element, and a series gated read port. The dual ported memory cell can be formed by a series connection of four devices, such as four transistors. Alternatively, the dual ported memory cell can be formed by a series connection of three devices and a capacitor, such as three transistors and a planar, a stacked, or a trench capacitor. In the four-transistor embodiment, one transistor functions as a capacitor to store a charge that is indicative of the value of a bit of the pixel data. On one side of the storage device is a write access device that is manipulated during a write operation to connect the storage device to a write bit line from which the digital word data is received. Connected to the same storage device are two series connected read devices that are separately controlled to read data to a local read bit line. The series connected read devices function as a local read decoder. The bit of digital word within the storage device is read only when both of the read devices are conducting. The configuration of the dual port memory cell accommodates the independent read and write operations.

Furthermore, each pixel contains an on-chip photosensitive element, such as a photodiode. Preferably, the photo-diodes are of alpha-silicon or a carbon polymer type. In the preferred embodiment, the photo-diodes are utilized to generate both photo signals and reference signals that are representative of dark frames used for the fixed pattern noise cancellation.

Also included in each pixel is an on-chip comparator which is utilized in part for an analog-to-digital (A/D) converting operation. The comparator is supplied with an A/D reference signal from on-chip peripheral circuitry. In the preferred embodiment, the A/D reference signal is a ramp signal from a ramp generator that is a part of the on-chip peripheral circuitry for the pixels. The comparator operates in unison with the ramp generator and a counter, which is also a part of the peripheral circuitry, to capture and store a digital count word generated by the counter in the memory array within each pixel. The peripheral circuitry may also include control and timing circuitry as well as an amplifier, a register, and an arithmetic circuit for the fixed pattern noise calculations.

In operation, the comparator in each pixel compares the ramp signal to the photo signal generated at that pixel. Simultaneously, the counter begins counting and supplying the pixel with the digital count word. One ramp signal and one series of digital count words are utilized by all the pixels in the matrix of the imaging apparatus. As an example, the digital count word could be eight bits wide for a count of two hundred fifty-six. When the ramp signal matches the photo signal, the comparator captures the last digital count word in a first row of memory cells within each pixel. The captured digital count word represents a digital photo signal word or the photo signal in a digital form.

In the preferred embodiment, the capturing-and-storing operation is performed a second time for "double sampling." The second sampling involves generating and converting a reference signal, and storing the reference signal in digital form. The digital reference signal is stored in a second row of memory cells in each pixel.

One advantage of the invention is that the photo signal is captured in each pixel in a parallel manner. This is accomplished by utilizing one ramp signal and one series of counts from the counter along with the memory array within each pixel that can store an entire digital word. All the photo signals in the pixels are compared at the same time. Thus, the rate of A/D conversions for all the photo signals is significantly increased. Consequently, the electronic shutter speed is increased, since the shutter speed is dependent upon the rate of A/D conversions.

Another advantage of the invention is that the difficulties typically associated with transferring an analog signal to a digital frame buffer memory are eliminated by on-chip A/D converting and on-chip storing the image information within the array of pixels.

DETAILED DESCRIPTION

Figure 1:
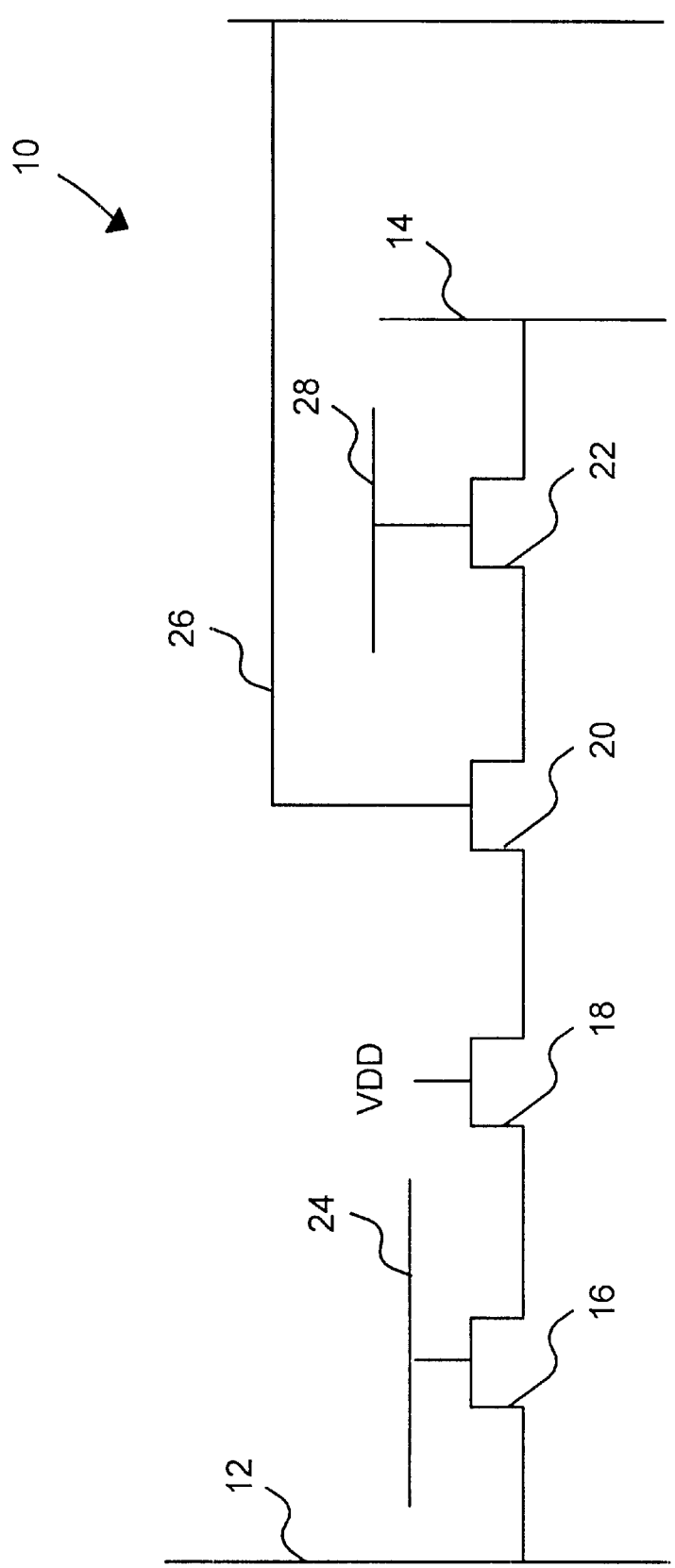
FIG. 1 is a schematic diagram of a dual port dynamic random access memory cell in accordance with the invention.

With reference to FIG. 1, a dual port dynamic random access memory (DRAM) cell 10 for use in an imaging senor is shown connected to a write bit line 12 and a read bit line 14. A write transistor 16, a storage transistor 18, a row read transistor 20, and a column read transistor 22 are connected in series, providing a conduction path from the write bit line 12 to the read bit line 14. The transistors 16, 18, 20 and 22 are shown as metal-oxide semiconductor (MOS) transistors.

A gate of the write transistor 16 is connected to a write line 24, while a gate of the storage transistor 18 is connected to a supply voltage (VDD). Gates of the row read transistor 20 and the column read transistor 22 are connected to a row read line 26 and a column read line 28, respectively.

In order to write a bit of data into the dual port DRAM cell 10, the storage transistor 18 is initially charged up to a set voltage by applying the VDD, for example 5 volts, to the gate of the storage transistor 18. The storage transistor 18 essentially functions as a capacitor. The actual writing of the data is accomplished by addressing the write line 24, turning "on" the write transistor 16 and receiving the bit of pixel data from the write bit line 12 while the conduction path to the read bit line 14 is blocked by either the transistor 20 or the transistor 22, either of which is turned "off" by a control signal to the row read line 26 or the column read line 28, respectively. Depending on whether the data is a "0" or a "1," the voltage stored in the storage transistor 18 will charge to one of two levels.

The reading of the data involves addressing both the row read line 26 and the column read line 28. Simultaneously addressing the read lines 26 and 28 turns on the row read transistor 20 and the column read transistor 22, providing a conduction path from the storage transistor 18 to the read bit line 14 while the conduction path to the write bit line 12 is blocked by the transistor 16 which is turned "off" by a control signal to the write line 24.

The two separate paths for the write and read operations allow independent rates and/or independent processes for writing and reading data to and from an array of dual port DRAM cells 10. For example, in the array of dual port DRAM cells 10, a row of cells can be written in a parallel manner, while the cells can be read in a serial manner to a set of local read bit lines.

An imaging sensor in accordance with the present invention contains a matrix of pixels and each pixel includes an array of dual port DRAM cells. In the preferred embodiment, the array contains enough dual port DRAM cells to store all the bits of a digital photo signal and the bits of a digital reference signal. For example, if the two signals are both 8-bit digital words, the array of memory cells in each pixel will have sixteen dual port DRAM cells. The reference signal could represent a "dark frame." Then, the reference signal can be used for a fixed pattern noise cancellation.

Figure 2:
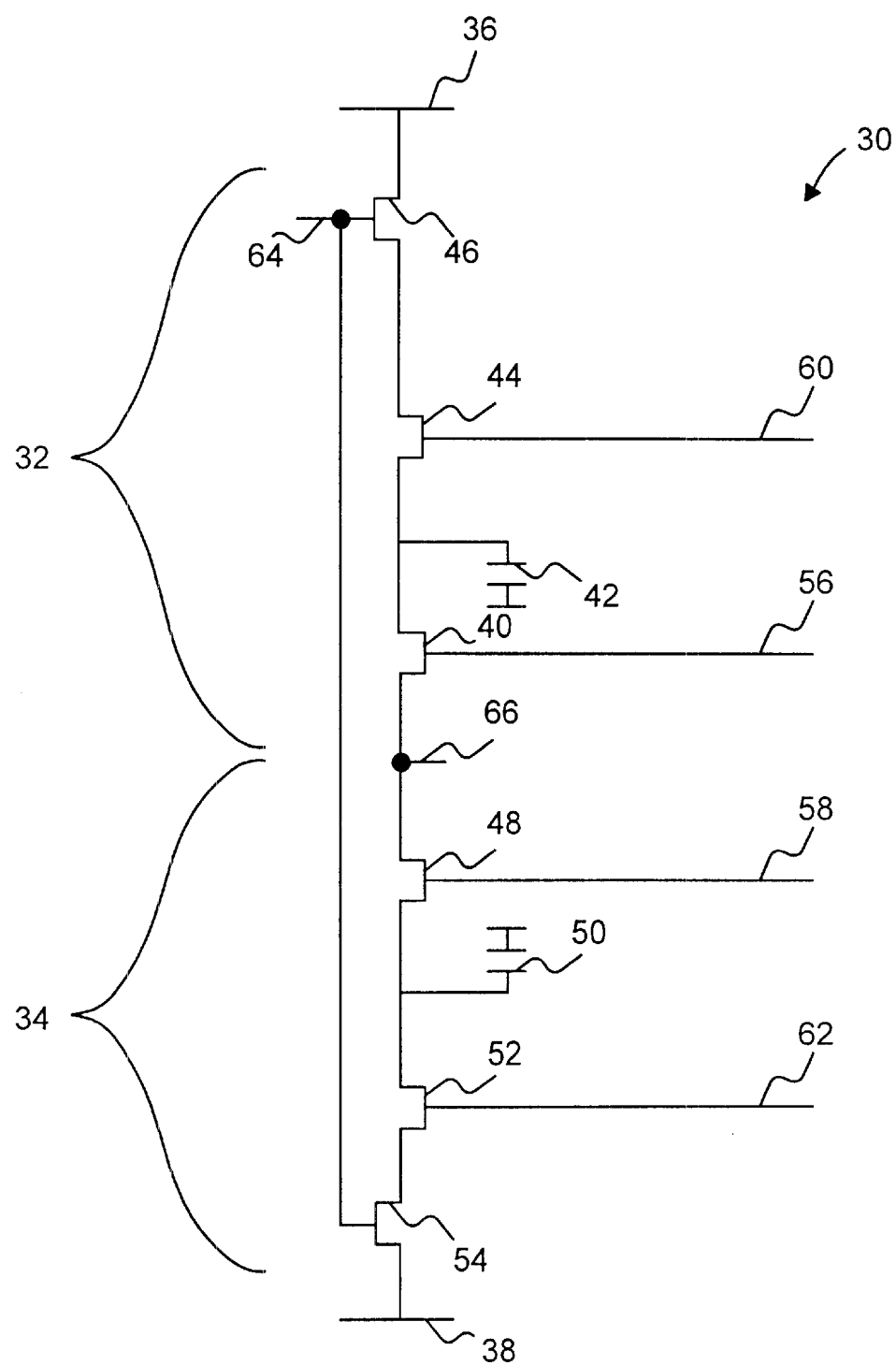
FIG. 2 is a schematic diagram of a memory column formed by two dual port dynamic random access memory cells of FIG. 1 in accordance with the invention.

Turning to FIG. 2, a schematic diagram of a memory column 30 formed by a series connection of two dual port DRAM cells of FIG. 1 is illustrated. An upper dual port DRAM cell 32 is connected in series to a lower dual port DRAM cell 34. The DRAM cells 32 and 34 provide a main connection from a counter write bit line 66 to a signal read bit line 36 and a reference signal read bit line 38.

The DRAM cell 32 includes a write transistor 40, a storage transistor 42 (shown as a capacitor), a row read transistor 44, and a column read transistor 46. Similarly, the DRAM cell 34 includes a write transistor 48, a storage transistor 50 (also shown as a capacitor), a row read transistor 52, and a column read transistor 54. A gate of write transistor 40 is connected to a signal write line 56, while a gate of write transistor 48 is connected to a reference write line 58. The storage transistors 42 and 50 have gates that are connected to VDD (not shown). Gates of row read transistors 44 and 52 are connected to a signal row read line 60 and a reference row read line 62, respectively. However, gates of column read transistors 46 and 54 are coupled and connected to a column read line 64. Connected between the DRAM cells 32 and 34 is the counter write bit line 66.

Briefly stated, the write operation for the DRAM cell 32 involves charging up the storage transistor 42 by applying VDD at its gate, receiving data from the counter write bit line 66, and turning "on" the write transistor 40 by applying voltage at the signal write line 56. The write operation for the DRAM cell 34 is accomplished in a similar manner by charging up the storage transistor 50, receiving data from the same counter write bit line 66, and turning "on" the write transistor 48 by applying voltage at the reference write line 58.

The written or stored data in either DRAM cell 32 and 34 is read by turning "on" the two series-gated transistors 44 and 46, or 52 and 54. In order to read from the DRAM cell 32, voltage is applied simultaneously at the signal row read line 60 and the column read line 64, turning "on" the transistors 44 and 46. For DRAM cell 34, voltage is applied simultaneously to the reference row read line 62 and the column read line 64, turning "on" the transistors 52 and 54. The stored data in the DRAM cell 32 is read through the signal read bit line 36, while the stored data in the DRAM cell 34 is read through the reference read bit line 38. Since the column read line 64 is attached to the gates of transistors 46 and 54, voltage is applied to the column read line 64 when either the upper DRAM cell 32 or the lower DRAM cell 34 is being read.

Figure 3:
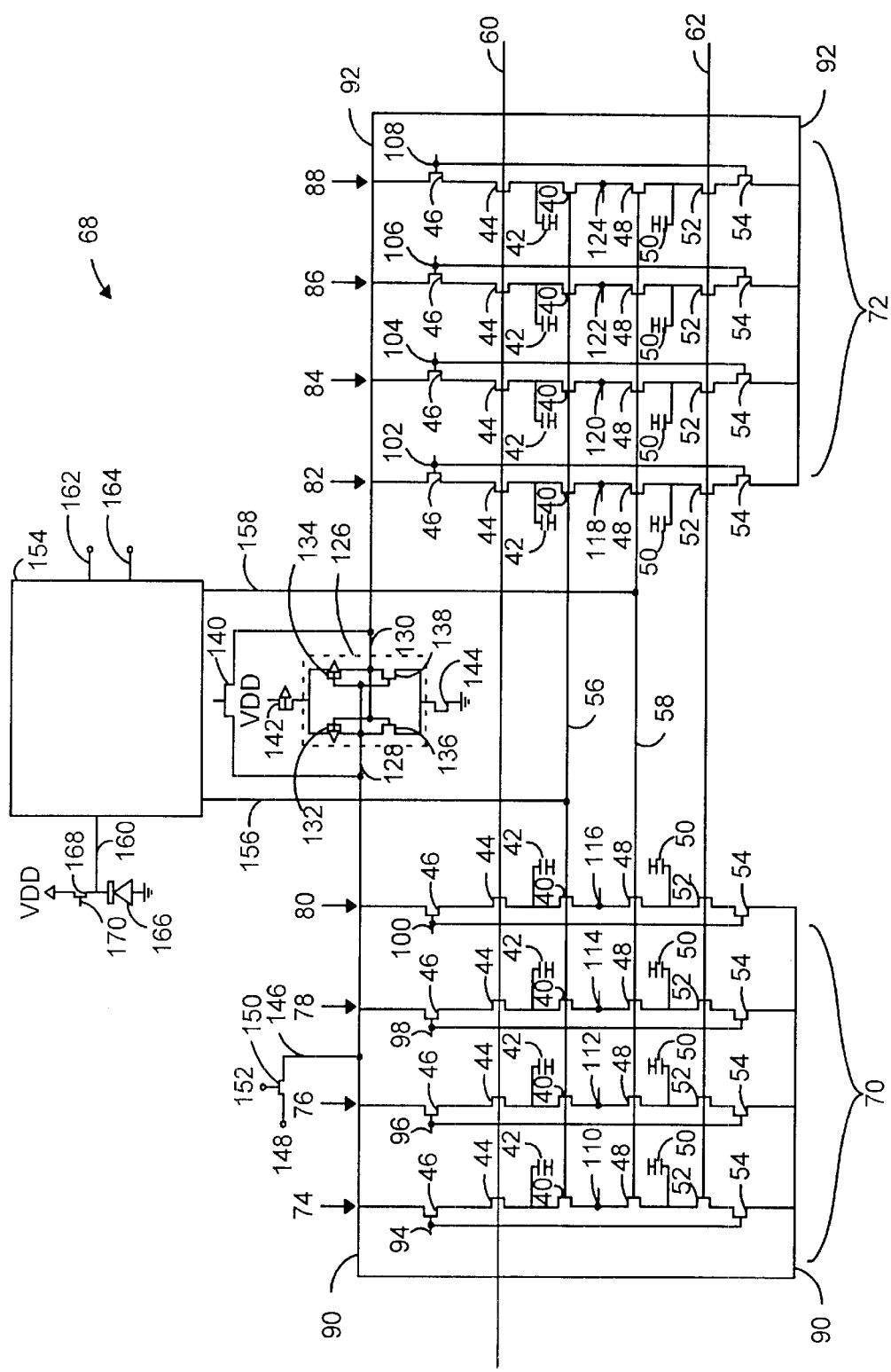
FIG. 3 is a schematic diagram of a CMOS active pixel with 16-bit memory in accordance with the invention.

Shown in FIG. 3 is a schematic diagram of a CMOS active pixel 68 with 16-bit memory. When applicable, the same reference numerals are used for the same components as shown in FIG. 2. The active pixel 68 includes a left memory array 70 and a right memory array 72. The memory cells contained in the memory arrays 70 and 72 are the dual port DRAM type described with reference to FIG. 1. The memory arrays 70 and 72 each contain eight dual port DRAM cells. The eight dual port DRAM cells contained in the left memory array 70 form memory columns 74, 76, 78 and 80, while the eight dual port DRAM cells of the right memory array 72 form memory columns 82, 84, 86 and 88. The upper DRAM cells of the memory columns 74–88 create a row of DRAM cells. The lower DRAM cells of the memory columns 74–88 create a second row of DRAM cells.

The devices comprising each of the memory columns 74–88 are configured identically to the memory column 30 in FIG. 2. However, the upper DRAM cell and the lower DRAM cell in each of the memory columns 74–88 are connected to the same read bit line. Both the upper and lower DRAM cells of the left memory array 70 are connected to a left read bit line 90 at both ends. The upper and lower DRAM cells of the right memory array 72 are connected to a right read bit line 92.

In addition, there are common electrical lines connecting functionally equivalent devices on the memory columns 74–88. The signal row read line 60 is connected to gates of all row read transistors 44, while the reference row read line 62 is connected to gates of all row read transistors 52. Also, all write transistors 40 are connected to the signal write line 56, and reference write line 58 is connected to all write transistors 48.

On the other hand, the interconnected column read transistors 46 and 54 for different memory columns 74–88 are connected to different electrical lines. Column read lines 94, 96, 98, 100, 102, 104, 106 and 108 are connected to gates of column read transistors 46 and 54 of memory columns 74–88, respectively. In addition, counter write bit lines 110, 112, 114, 116, 118, 120, 122 and 124 are connected to the memory columns 74–88, respectively.

The configuration of the memory columns 74–88 allows one 8-bit word to be stored in the upper DRAM cells of the memory columns 74–88 and another 8-bit word to be stored in the lower DRAM cells of the memory columns 74–88. Such configuration facilitates a double sampling process in which a reference signal and a photo signal are individually sampled. The two signals can be utilized in external circuitry for fixed pattern noise cancellation in which the reference signal is subtracted from the photo signal. The fixed pattern noise cancellation can be performed in peripheral circuitry included within an imaging device, but external to the pixels. Alternatively, the fixed pattern noise cancellation can be performed in a host computer using computer software.

The read and write operations for the individual memory columns 74–88 may be executed in the same manner as described in reference to the memory column 30 of FIG. 2. The read and write operations for the memory columns 74–88 as a whole will be more fully addressed below.

Although the active pixel 68 contains sixteen DRAM cells, the invention is not limited by the number of dual port DRAM cells contained in each pixel. Other pixel designs using twenty or more dual port DRAM cells are contemplated. The number of dual port DRAM cells that could be fabricated on a single pixel is only limited by the chip manufacturing technology. Therefore, additional dual port DRAM cells can be placed in a single pixel to yield a variety of active pixels.

Connected to the memory arrays 70 and 72 in the active pixel 68 is a sense amplifier 126. The left read bit line 90 is connected to one output terminal 128 of the sense amplifier 126 and the right read bit line 92 is connected to a second output terminal 130. The sense amplifier 126 is a cross coupled latch gated sense amplifier having two P-channel MOS transistors 132 and 134 and two N-channel MOS transistors 136 and 138. Gates of transistors 132 and 136 are coupled and connected to the output terminal 130. Similarly, gates of transistors 134 and 138 are coupled and connected to the output terminal 128. The output terminal 128 is also connected to the source/drain electrodes of the transistors 132 and 136, where the two transistors 132 and 136 join. The output terminal 130 is connected to the source/drain electrodes of transistors 134 and 138 in the same manner. The output terminals 128 and 130 are also connected to a switch 140 (shown as a transistor), providing a switchable direct path between the two output terminals 128 and 130.

The sense amplifier 126 provides a path from VDD to ground. A switch 142 (shown as a transistor) provides a connection from VDD to the sense amplifier 126, while a switch 144 (shown as a transistor) provides a connection from the sense amplifier 126 to ground.

The sense amplifier 126 is a dynamic device and requires a precise timing sequence. During an initial precharge state, the switch 140 is turned "on," connecting the output terminals 128 and 130 to each other. The connection equalizes the output terminals 128 and 130 of the sense amplifier 126 to approximately one-half of VDD, or 2.5 volts. Then, the switch 140 is opened, disconnecting the output terminals 128 and 130 of the sense amplifier 126. The sense amplifier 126 is now ready to receive a bit of pixel data.

At this point, one of the sixteen dual port DRAM cells of the active pixel 68 is selected to be read to the sense amplifier 126. The selected dual port DRAM cell could be located on the left memory array 70 or the right memory array 72. Depending upon the location and the bit of pixel data stored, the selected dual port DRAM cell will pull the left read bit line 90 or the right read bit line 92 either low or high. Then, the switch 142 is closed, connecting the two P-channel MOS transistors 132 and 134 of the sense amplifier 126 with VDD. Simultaneously, the switch 144 is closed, providing a conduction path from the two N-channel MOS transistors 136 and 138 of the sense amplifier 126 to ground.

The imbalance between the two output terminals 128 and 130 of the sense amplifier 126 caused by the bit of pixel data "swings" the sense amplifier 126 to one side. The swing of the sense amplifier 126 drives one of the output terminals 128 and 130 of the sense amplifier 126 to a high voltage (VDD) and the other output terminal to a low voltage (ground) in the direction of the memory cell that was selected. The high or low voltage causes the dual port DRAM cell that was selected to be refreshed or restored.

The bit of pixel data that was selected can be extracted out of the 16-bit active pixel 68 to external circuitry through a read pixel line 146. The read pixel line 146 leads to a node 148, where the data that was read can be transferred to peripheral circuitry of the active pixel 68. The read pixel line 146 provides a conduction path from the left read bit line 90 to the node 148 through a switch 150 (shown as a transistor). The gate of switch 150 is connected to a row_read line 152.

After the bit of pixel data has been sensed, voltage is applied to the row_read line 152 which closes the switch 150. If the dual port DRAM cell that was selected is located in the left memory array 70, the voltage at the output terminal 128 and the left read bit line 90 represents the bit of pixel data that was read. The bit of pixel data will appear at the node 148. If the dual port DRAM cell that was selected is located in the right memory array 72, the voltage at the output terminal 128 and the left read bit line 90 represents an inverse of the bit of pixel data that was read, which will also appear at the node 148, but will be inverted within the external circuitry. In an alternative design, a second read pixel line is attached to the right read bit line 92, similar to the read pixel line 146.

Also connected to the memory arrays 70 and 72 is a comparator 154. The comparator 154 has a signal output terminal 156 and a reference output terminal 158. In addition, the comparator 154 has an input terminal 160, a ramp terminal 162, and a sig/ref select terminal 164. The input terminal 160 is connected to a photodiode 166 and a reset switch 168 (shown as a transistor). The photodiode 166 is also connected to ground, while the switch 168 is connected to VDD. The switch 168 has a gate that is connected to a reset terminal 170. The particular type of the photodiode 166 is not crucial to the invention. The photodiode 166 could be an alpha-silicon type photodiode or a carbon polymer type photodiode that is fabricated on a semiconductor chip.

The operation of the 16-bit active pixel 68 involves first sampling the reference signal which is digitized and stored, and then sampling the photo signal generated by the photodiode 166, which is also digitized and stored. Initially, a select signal is sent to the comparator 154 through the sig/ref select terminal 164 to prepare for the sampling of the reference signal. The select signal directs the comparator 154 to send a high voltage signal only through the reference output terminal 158. To generate the reference signal, a pulse of voltage is applied at the reset terminal 170, closing the switch 168 for a short period, thereby connecting the photodiode 166 to VDD. The connection to VDD causes the photodiode 166 to generate a reference voltage across the photodiode 166. The reference voltage appears at the input terminal 160 as the reference signal.

Simultaneously, a ramp signal is applied to the ramp terminal 162 from an external voltage ramp generator (not shown). In addition, a series of 8-bit digital count words is applied to the counter write bit lines 110–124 from another external device, a single 8-bit counter (not shown). In this embodiment, the 8-bit counter generates counts from one to two hundred fifty-five.

The comparator 154 begins by sending a high voltage signal through the reference output terminal 158 and a low voltage signal through the signal output terminal 156. The high signal appears at the reference write line 58, which turns "on" all the write transistors 48 attached to the reference write line 58. The low signal through the signal output terminal 156 turns "off" all the write transistors 40. The comparator 154 compares the reference signal with the ramp signal while the 8-bit counter is operating. When the ramp signal matches the reference signal, the comparator 154 sends a low signal through the reference output terminal 158 which turns "off" all the write transistors 48. The final count by the 8-bit counter is captured in the storage transistors 50 in an 8-bit digital form, where each bit of the 8-bit count word is stored in each storage transistor 50. Thus, the reference signal has been digitized and stored in the eight lower DRAM cells of the memory columns 74–88. Since the write transistors 40 were turned "off" during the reference signal sampling, the upper DRAM cells of the memory columns 74–88 are not affected.

The sampling of the photo signal is accomplished in a similar manner. A select signal is applied to the sig/ref select terminal 164, directing the comparator 154 to send a high voltage signal only through the signal output terminal 156. The comparator 154 sends a high signal through the signal output terminal 156 and a low signal through the reference output terminal 158. The high signal turns "on" the write transistors 40, allowing the storage transistors 42 to be accessed while the low signal turns the write transistors 48 "off."

During the previous reference signal sampling, the photodiode 166 had been connected to VDD. To generate the photo signal, the reset switch 168 is opened and the photodiode 166 is exposed to incident light from an image for a fixed period of time. The physical properties of the photodiode 166 allow the accumulated electrical charge in the photodiode 166 to discharge. During the exposure to incident light, the photodiode 166 enhances the discharge of the accumulated electrical charge such that the discharge is proportional to the intensity of the incident light. The electrical discharge appears at the input terminal 160 as the photo signal.

Identical to the reference signal sampling process, the photo signal is compared with a ramp signal in the comparator 154. Concurrently, the 8-bit counter begins the count, sending bits of count words to the counter write bit lines 110–124 in the memory columns 74–88. When the ramp signal matches the photo signal, the comparator 154 sends a low voltage signal through the signal write line 56, turning "off" all the write transistors 40, which are controlled by the signal write line 56. Thus, the last count from the 8-bit counter is stored digitally in the storage transistors 42.

Once the reference signal and the photo signal are digitally captured, the bits of data stored in each DRAM cell in the 16-bit active pixel can be refreshed and/or read. The read operation involves the same process as the refresh operation, with an additional step of extracting the bits of data that were read to the external circuitry. To read or refresh, the switch 140 is turned "on," connecting the output terminals 128 and 130 to each other. The connection equalizes the two sides of the sense amplifier 126 to approximately one-half of VDD. Then, the switch 140 is turned "off," disconnecting the output terminals 128 and 130 of the sense amplifier 126.

Next, one of the sixteen dual port DRAM cells of the 16-bit active pixel 68 is selected to be read/refreshed. The selected dual port DRAM cell could be located on the left memory array 70 or the right memory array 72. Depending upon the location and the bit of pixel data stored, the selected dual port DRAM cell will pull the left read bit line 90 or the right read bit line 92 either low or high. Then, the switch 142 is closed, connecting the sense amplifier 126 with VDD. Simultaneously, the switch 144 is closed, providing a conduction path from the sense amplifier 126 to ground.

The imbalance between the two output terminals 128 and 130 of the sense amplifier 126 caused by the bit of pixel data "swings" the sense amplifier 126 to one side. The swing of the sense amplifier 126 drives one of the output terminals 128 and 130 of the sense amplifier 126 to a high voltage (VDD) and the other output terminal to a low voltage (ground) in the direction of the memory cell that was selected. The high or low voltage causes the dual port DRAM cell that was selected to be refreshed or restored.

The bit of pixel data can be read out of the 16-bit active pixel 68 through the read pixel line 146. To extract the data after being sensed, voltage is applied to the row_read line 152, which closes the switch 150. The closed switch 150 allows the bit of data to be read to the external or peripheral circuitry connected to the node 148.

The active pixel 68 has several advantages over known imaging sensors. An imaging sensor that does not have on-pixel ADC at each pixel requires high speed ADC to lessen the effects of image degradation during a serial readout of the analog pixel data. Moreover, by having the memory within the pixels, the added complexities associated with an external frame buffer memory are eliminated.

Figure 4:
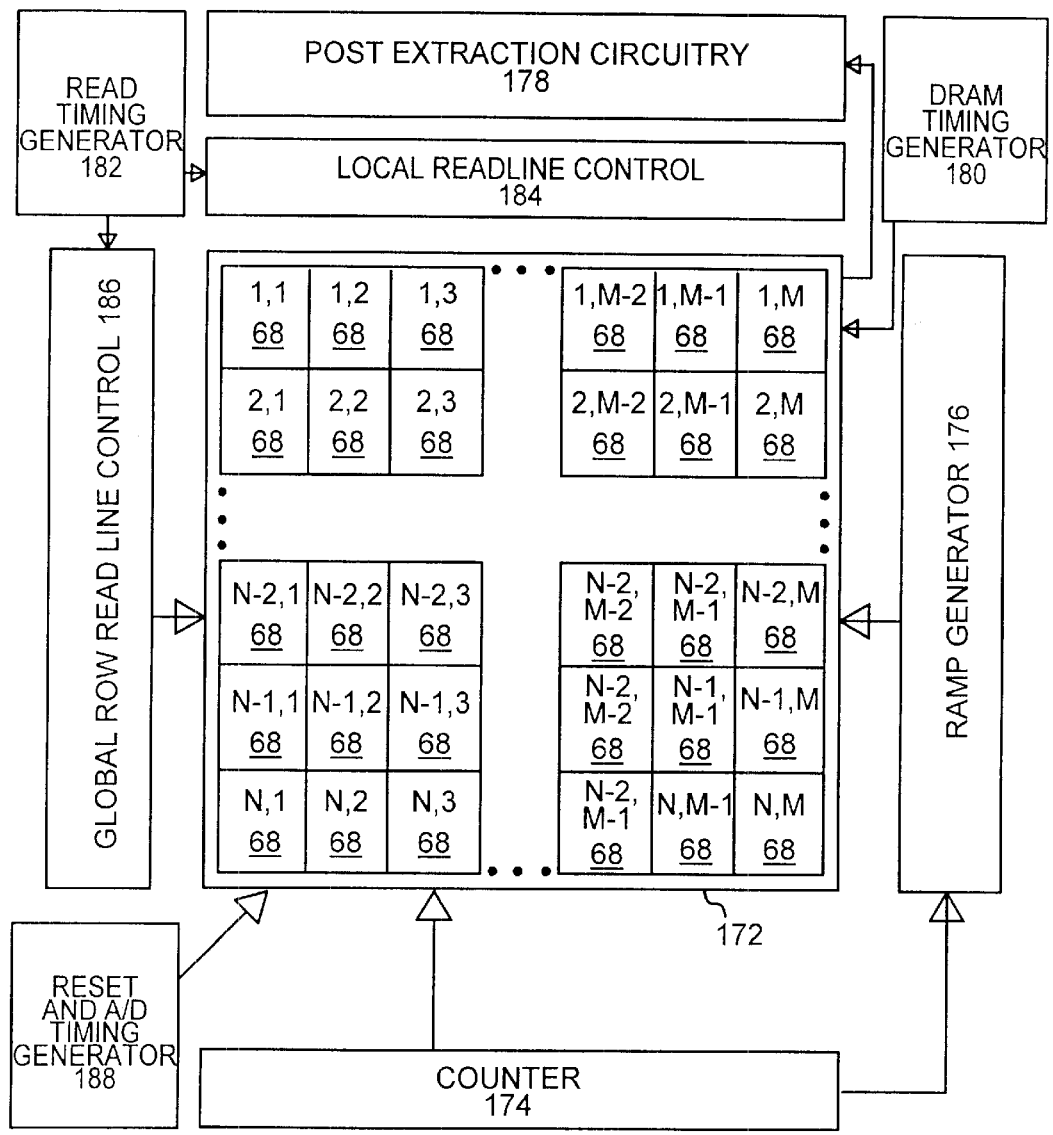
FIG. 4 is a block diagram of an imaging sensor having a matrix of CMOS active pixels in accordance with the invention.

With reference to FIG. 4, a block diagram of an imaging sensor with a matrix 172 of active pixels 68 is shown with surrounding peripheral circuitry. The active pixels 68 are the same type described in FIG. 3. The matrix 172 contains N×M active pixels 68. For a VGA imaging sensor, 307,200 active pixels 68 would be contained in the matrix 172. However, the number of active pixels 68 in the matrix 172 is not crucial to the invention.

A counter 174 is connected to the matrix 172. The counter 174 generates the digital counts which are utilized in the matrix 172 during the reference signal and the photo signal sampling procedures. The counter 174 also controls a ramp generator 176, which provides the ramp signal that is used by the comparator 154 in each active pixel 68.

Post extraction circuitry 178, which is also connected to the matrix 172, includes a second DRAM sense amplifier, a noise subtraction circuit, and a register. The second DRAM sense amplifier within the post extraction circuitry 178 amplifies the data that is read from the matrix 172. The noise subtraction circuit performs the fixed pattern noise cancellation. Lastly, the register serves as temporary storage for data that is read from the matrix 172. For example, N rows within the matrix 172 can be read at a time. For a VGA imager with 16-bit active pixels, the data register must have a capacity to store 640×16 bits of data.

A DRAM timing generator 180 provides the signals to initialize and operate the sense amplifiers 126 within each pixel of the matrix 172. A read timing generator 182 initiates the signals needed to turn "on" the two read access transistors 44 and 46, or 52 and 54, in each pixel. The read timing generator 182 is connected to a local read line control 184 and a global row read line control 186. The global row read line control 186 provides the signal to turn on the row read transistors 44 or 52 for either the stored photo signal data or the stored reference signal data in all the pixels. The local read line control 184 provides the signal to turn "on" the column transistors 46 or 54 in a particular memory column in each pixel of the matrix 172.

A reset and A/D timing generator 188 provides a reset control signal for the active pixels 68. In addition, the reset and A/D timing generator 188 controls the start of the counter 174 and the ramp generator 176 during sampling procedures.

Figure 5:
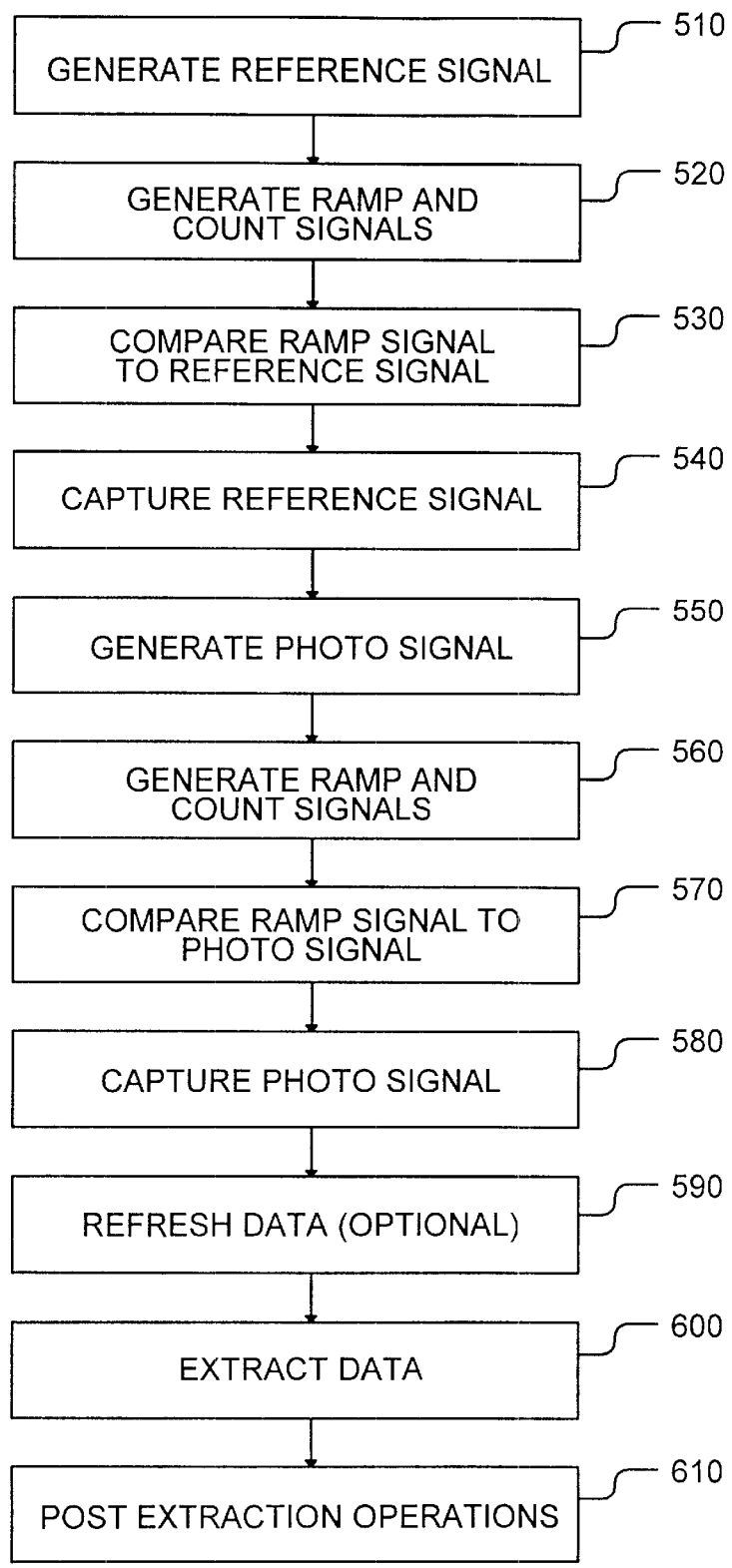
FIG. 5 is a flow diagram of a method of capturing and storing an image in digital form in accordance with the invention.

The operation of the imaging sensor of FIG. 4 and the method of capturing, digitizing, and storing an image in accordance with the invention will be described with reference to FIGS. 3, 4, and 5. At step 510 In FIG. 5, a reference signal is generated in each pixel of matrix 172. The order of the signals that are generated and subsequently sampled is not crucial to the invention. However, the preferred method is to sample the reference signal, followed by the photo signal. Generating the reference signal is accomplished when the reset and A/D timing generator 188 sends a reset signal to the gate of switch 168. As described above in reference to FIG. 3, the connection of VDD to the photodiode 166 creates a reference voltage across the photodiode 166. The reference voltage appears at the input terminal 160 as the reference signal in each pixel. Therefore, N×M reference signals are generated in the matrix 172 with N×M pixels.

Next, at step 520, the ramp signal is generated by the ramp generator 176 and the counts are generated by the counter 174. Both the counter 174 and the ramp generator 176 are initialized by signals from the reset and A/D timing generator 188. The imaging sensor of FIG. 4 requires only one ramp signal and one count, since the signals are sampled in a parallel manner. The ramp signal is received by the comparator 154 through the ramp terminal 162 in each pixel. For an imaging sensor with 16-bit active pixels, the count in an 8-bit format is applied to the counter write bit lines 110–124, which is connected to all the pixels in the matrix 172. For 8-bit analog-to-digital conversion, the counter frequency to be utilized may vary from 10 MHz to 1 KHz. As an example, the counter timing could be 10 MHz counter clock (counter period=100 ns), which would yield a counter time of 25.6 $\mu$s.

At this point, a signal is applied on the sig/ref select terminal 164 in each pixel, selecting the reference output terminal 158. The comparator 154 sends a high voltage signal through the reference output terminal 158, turning "on" the write transistors 48 in all the pixels.

Comparison of the ramp signal to the reference signal is accomplished during step 530. The comparator 154 in each pixel compares the ramp signal to the reference signal. The comparator 154 continues to operate until the ramp signal equals the reference signal. During the comparison process, the counter 174 continues the count and sends the digitized counts in 8-bit format through the counter write bit lines 110–124.

At step 540, the reference signal is captured. When the ramp signal matches the reference signal, the comparator 154 in each pixel sends a low voltage signal through the reference output terminal 158, turning "off" the write transistors 48. The last count from the counter is captured and stored in the storage transistors 50. Since the reference signals can vary from pixel to pixel, the count is captured at various times. However, since all the pixel are using a single series of counts, all the reference signals are being converted into the digital form in a parallel manner. For example, for a VGA imager, the imaging sensor of FIG. 4 is processing over 300,000 A/D conversions. The captured count represents the reference signal in digital form.

Step 550 involves generating the photo signal for sampling. A low signal is supplied to the reset switch 168 in each pixel, closing the switch 168. As stated above in reference to FIG. 3, the properties of the photodiode 166 create the photo signal when incident light is applied to the photodiode 166 for a period of time (integration time). The integration time is determined by the reset and A/D timing generator 188 to develop a meaningful photo signal.

At step 560, the ramp signal and the digital counts are generated in the same manner as described above for step 520. However, a different select signal is applied to the sig/ref select terminal 164 in each pixel, designating the signal output terminal 156. The comparator 154 sends a high voltage signal through the signal output terminal 156, turning "on" the write transistors 40 in all the pixels.

Step 570 of comparing the ramp signal to the photo signal is accomplished in a similar manner as described in step 530. The only difference is that the ramp signal is compared with the photo signal instead of the reference signal.

At step 580, when the ramp signal matches the photo signal, the count is captured in the storage transistors 42. This time, the comparator 154 in each pixel sends a low voltage signal through the signal output terminal 156, turning "off" the write transistors 40. Therefore, the last count from the counter is captured and stored in digital form in the storage transistors 42. Again, since the photo signals can vary from pixel to pixel, the count is captured at various times during the count series. The captured count in digital form represents the photo signal.

Since the imaging sensor of FIG. 4 performs the A/D converting and storing operations in a parallel manner, the electronic shutter speed is increased significantly. The electronic shutter speed equals the photodiode 166 integration time plus the counter time. The significant increase in the shutter speed is the result of the parallel A/D conversions performed by the imaging sensor. For an integration time of 256 $\mu$s, the imaging sensor of FIG. 4 would have a maximum electronic shutter speed of 256 $\mu$s or ¹⁄₄₀₀₀ s.

An optional step 590 involves refreshing the data stored in the pixels of the matrix 172. The read timing generator 182 engages the local read line control 184 and the global row read line control 186. Since accessing a particular dual port DRAM cell involves turning "on" both read transistors 44 and 46, or 52 and 54, two signals are needed. For example, to access the top left dual port DRAM cell in the left memory array 70 in FIG. 3, read transistors 44 and 46 must both be turned "on." The global row read line control 186 sends a signal to the signal row read line 60, turning "on" the row read transistors 44. The local read line control 184 sends another signal to the column read line 94, turning on the column transistors 46 and 54 in the memory column 74.

Once a DRAM cell is accessed, the data appears at either the left read bit line 90 or the right read bit line 92. The presence of data on one of the read bit lines 90 and 92 causes an imbalance in the sense amplifier 126 in each pixel. As described above with reference to FIG. 3, the sense amplifier 126 swings and causes the data to be restored or refreshed back into the DRAM cell that was accessed. The required signals for the sense amplifier 126 are supplied by the DRAM timing generator 180. In a similar manner, all DRAM cells in each pixel of the matrix 172 can be refreshed.

Extracting or reading the digital photo signals and the digital reference signals from the matrix 172 is accomplished at step 600. The step 600 involves tapping into the left read bit line 90 while each DRAM cell is being refreshed. After a DRAM cell is accessed and sensed by the sense amplifier 126, a signal is applied to the switch 150. The switch 150 allows a connection from the left read bit line 90 to the peripheral circuitry through the node 148. The bits of data in a single pixel are read in a serial fashion for an entire row of pixels in the matrix 172. After one row of pixels has been read, another row of pixels is read in a serial fashion.

At step 610, amplification and fixed pattern noise cancellation, as well as other post extraction operations, are performed. The post extraction operations are executed within the post extraction circuitry 178 in the imaging sensor of FIG. 4.

What is claimed is:

1. An imaging apparatus having a photosensitive area formed by a matrix of pixels in which incident light is captured, digitized, and stored, said pixels being formed on a monolithic chip, each pixel comprising:

photodetecting means located within a pixel region of said monolithic chip for generating an analog photo signal that is representative to an intensity of said incident light on said each pixel;

analog-to-digital converting means located within said pixel region and operatively connected to said photodetecting means for transforming said analog photo signal to a digital photo signal word, said digital photo signal word being indicative of incident light intensity information; and memory connected to said analog-to-digital means to receive said digital photo signal word, said memory including at least one memory cell located within said pixel region of said monolithic chip, each said at least one memory cell being a dual port memory cell, said dual port memory cell having a write bit line connected to receive said digital photo signal and a read bit line, said write and read bit lines being isolated such that said dual port memory cell is independently accessible with respect to read and write operations.

2. The imaging apparatus of claim 1 wherein said dual port memory cell is a dynamic random access memory cell having a bit storage device between at least one write access switch and at least one read access switch.

3. The imaging apparatus of claim 1 wherein said memory includes a plurality of memory cells, with at least as many memory cells as there are bits in said digital photo signal word.

4. The imaging apparatus of claim 3 further comprising means for generating a digital reference signal word for providing noise cancellation, with the number of said memory cells corresponding to the sum of bits of said digital photo signal word and said digital reference signal word.

5. The imaging apparatus of claim 4 wherein said digital photo signal word and said digital reference signal word are at least 8-bit digital words.

6. The imaging apparatus of claim 1 further comprising a counter operatively connected to said each pixel to provide a plurality of digital count words to said each pixel to enable parallel analog-to-digital conversions.

7. The imaging apparatus of claim 6 further comprising a ramp generator operatively connected to said each pixel to provide a ramp signal to said each pixel.

8. The imaging apparatus of claim 1 wherein said photodetecting means includes a photodiode and said monolithic chip is a semiconductor chip.

9. An imaging sensor comprising:

a monolithic semiconductor substrate;

a matrix of pixels located on said monolithic semiconductor substrate, each pixel including a photodetector and an array of memory cells, said memory cells being dual port memory cells having a storage device that is isolated by said at least two switches; and peripheral circuitry means connected to said pixels for providing control and timing signals to said pixels and for processing signals received from said pixels.

10. The imaging sensor of claim 9 wherein said each pixel contains at least sixteen said dual port memory cells.

11. The imaging sensor of claim 9 wherein said peripheral circuitry means is located on said monolithic semiconductor substrate and includes a counter for generating a digital count word, said digital count word being simultaneously provided to each said pixel in said matrix.

12. The imaging sensor of claim 11 wherein said peripheral circuitry includes a ramp generator for supplying a ramp signal to each said pixel in said matrix.

13. The imaging sensor of claim 12 wherein each said pixel includes a comparator for comparing a photo signal generated by said photodetector with said ramp signal.

14. A method of capturing, digitizing, and storing an image using an image sensor having a plurality of pixels on a monolithic structure, said method comprising steps of:

generating a photo signal in an analog format at each pixel of said plurality of pixels, said photo signal being responsive to an intensity of incident light sensed at said each pixel;

converting said photo signal into a digital photo signal word at each of said plurality of pixels;

storing said digital photo signal word in a memory array located within each of said plurality of pixels;

generating a reference signal in an analog format at each of said pixels, said reference signal being representative of a dark frame;

converting said reference signal into a digital reference signal word at each of said pixels; and storing said digital reference signal word in said memory array located within each of said pixels, including using separate portions of said memory array to store said digital reference signal word and said digital photo signal word.

15. The method of claim 14 wherein said step of converting said photo signal is accomplished in a parallel manner with respect to all of said pixels in said image sensor.

16. The method of claim 15 wherein said step of storing said digital photo signal word is accomplished in a parallel manner with respect to all of said pixels in said image sensor.

17. The method of claim 15 further comprising a step of selectively refreshing said digital photo signal word that has been stored in each said memory array of said plurality of pixels.

18. An imaging apparatus having a photosensitive area formed by a matrix of pixels in which incident light is captured, digitized, and stored, said pixels being formed on a monolithic chip, each particular pixel comprising:

photodetecting means located within a pixel region of said particular pixel of said monolithic chip for generating an analog photo signal that is representative to an intensity of said incident light on said particular pixel;

analog-to-digital converting means located within said pixel region and operatively connected to said photodetecting means for transforming said analog photo signal to a digital photo signal word, said digital photo signal word being indicative of incident light intensity information; and memory having a first multi-bit storage connected to said analog-to-digital means to receive and store said digital photo signal word, said memory having a second multi-bit storage connected to store a digital reference signal word that is representative of noise associated with said particular pixel, said memory being memory cells located within said pixel region of said particular pixel.

19. The imaging apparatus of claim 18 wherein said first and second multi-bit storages include an equal number (N) of memory cells, wherein N is at least eight.

* * * * *